US012263882B2

(12) United States Patent
Kang et al.

(10) Patent No.: US 12,263,882 B2
(45) Date of Patent: Apr. 1, 2025

(54) VEHICLE INTERMEDIATE STRUCTURE

(71) Applicants: Hyundai Motor Company, Seoul (KR); Kia Corporation, Seoul (KR)

(72) Inventors: Jeon Woong Kang, Hwaseong-si (KR); Huen Sick Min, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 442 days.

(21) Appl. No.: 17/847,466

(22) Filed: Jun. 23, 2022

(65) Prior Publication Data

US 2023/0143298 A1 May 11, 2023

(30) Foreign Application Priority Data

Nov. 9, 2021 (KR) .................. 10-2021-0153394

(51) Int. Cl.
*B62D 21/02* (2006.01)
*B62D 25/02* (2006.01)
*B62D 27/02* (2006.01)

(52) U.S. Cl.
CPC ............. *B62D 21/02* (2013.01); *B62D 25/02* (2013.01); *B62D 27/02* (2013.01)

(58) Field of Classification Search
CPC ...... B62D 21/02; B62D 21/03; B62D 25/025; B62D 25/08; B62D 27/02
USPC ..... 296/193.05, 193.08, 203.03, 203.04, 209
See application file for complete search history.

(56) References Cited

U.S. PATENT DOCUMENTS

| 6,234,568 | B1* | 5/2001 | Aoki | B62D 29/008 |
| | | | | 296/205 |
| 7,963,588 | B2* | 6/2011 | Kanagai | B62D 25/025 |
| | | | | 296/203.03 |
| 10,710,644 | B2* | 7/2020 | Kim | B60N 2/005 |
| 11,014,614 | B2* | 5/2021 | Ayuzawa | B62D 25/2036 |
| 2009/0058142 | A1* | 3/2009 | Park | B62D 21/00 |
| | | | | 296/193.07 |
| 2010/0301637 | A1* | 12/2010 | Matsuura | B62D 25/087 |
| | | | | 296/204 |
| 2013/0200650 | A1* | 8/2013 | Matsuoka | B62D 25/025 |
| | | | | 296/187.1 |

* cited by examiner

*Primary Examiner* — Jason S Daniels
(74) *Attorney, Agent, or Firm* — Slater Matsil, LLP (57) ABSTRACT

An embodiment vehicle intermediate structure includes a first intermediate crossmember connecting a pair of side sills in a width direction of a vehicle, wherein each end face of the first intermediate crossmember is attached to an inboard side surface of the corresponding side sill, and wherein a cross section of the first intermediate crossmember is uniform in a longitudinal direction thereof.

20 Claims, 10 Drawing Sheets

VEHICLE INTERMEDIATE STRUCTURE

CROSS-REFERENCE TO RELATED APPLICATIONS

This application claims the benefit of Korean Patent Application No. 10-2021-0153394, filed on Nov. 9, 2021, which application is hereby incorporated herein by reference.

TECHNICAL FIELD

The present disclosure relates to a vehicle intermediate structure.

BACKGROUND

A vehicle frame, which is a structure designed to install chassis components or a vehicle body, should be sufficiently protected from local or overall damages due to deformation, torsion, tension, compression, and/or vibration caused by the vehicle's propulsion force, brake action, a centrifugal force during steering, an impact from a road surface, a vertical load due to the weight of the vehicle body, and various reaction forces. It should be of a structure that can sufficiently absorb impact energy applied to the vehicle in the event of a collision.

Due to diversification of the vehicle market, the vehicle body structure is being changed in various ways from an existing monocoque structure to a novel structure such as a purpose built vehicle (PBV) frame and a space frame, to meet each vehicle's purpose. In particular, a low-cost electric vehicle (EV) requires a vehicle body structure which is created by breaking an existing method in order to maximize profitability.

Existing vehicles use pressed steel materials and aluminum materials for the vehicle body structure, and thus the material cost and investment cost thereof may be relatively high.

A lower structure of an existing vehicle may include a center floor, a rear floor connected to the center floor, and an intermediate crossmember dividing the lower structure into the center floor and the rear floor.

The rear floor may be located higher than the center floor, and the intermediate crossmember may extend from a rear end of the center floor to a front end of the rear floor. A front mounting portion of a rear seat may be mounted on the intermediate crossmember, and accordingly the intermediate crossmember may support the front mounting portion of the rear seat. An upper panel and a lower panel manufactured by pressing may be combined to form the intermediate crossmember, and the intermediate crossmember may extend in a width direction of the vehicle. A cross section of the intermediate crossmember may significantly affect the overall torsional stiffness of the vehicle, and the intermediate crossmember may protrude upwardly from the center floor, which may reduce formability.

The intermediate crossmember may connect a pair of rear side members disposed on both sides of the rear floor. Each end portion of the intermediate crossmember may be joined to the corresponding rear side member.

However, the cross section of the conventional intermediate crossmember may not be uniform in the width direction of the vehicle due to limitations in the structural features and manufacturing process thereof. In particular, a cross sectional area of the intermediate crossmember may be reduced at each end portion thereof. Accordingly, stiffness of the intermediate crossmember itself and stiffness at a joint between the intermediate crossmember and the rear side member may be reduced, resulting in reduced torsional stiffness of the vehicle body structure.

The cross section of the intermediate crossmember may not be uniform in the width direction of the vehicle, and in particular, the cross sectional area of the intermediate crossmember may be reduced from a center portion thereof toward both end portions thereof. Accordingly, connection stiffness between the side sills and the rear side members at respective end portions of the intermediate crossmember may be reduced. In this case, the rear side members may be significantly deformed in the event of a rear collision of the vehicle, and accordingly a rear end of a battery may be significantly deformed upwards. A rear subframe may directly hit the rear of the battery and intrude into the rear of a passenger compartment. A cable of the battery may be bent, which may cause a high risk of fire.

The above information described in this background section is provided to assist in understanding the background of the inventive concept, and may include any technical concept which is not considered as the prior art that is already known to those skilled in the art.

SUMMARY

The present disclosure relates to a vehicle intermediate structure. Particular embodiments relate to a vehicle intermediate structure having a uniform cross section in a width direction of the vehicle, thereby improving stiffness of a vehicle frame itself.

Embodiments of the present disclosure can solve problems occurring in the prior art while advantages achieved by the prior art are maintained intact.

An embodiment of the present disclosure provides a vehicle intermediate structure having a uniform cross section in a width direction of the vehicle, thereby improving stiffness of a vehicle frame itself.

According to an embodiment of the present disclosure, a vehicle intermediate structure may include a first intermediate crossmember connecting a pair of side sills in a width direction of a vehicle, wherein each end face of the first intermediate crossmember may be attached to an inboard side surface of a corresponding side sill, and a cross section of the first intermediate crossmember may be uniform in a longitudinal direction thereof.

The first intermediate crossmember may connect the pair of side sills in the width direction of the vehicle, and the first intermediate crossmember may have the uniform cross section in the longitudinal direction thereof so that the first intermediate crossmember may improve torsional stiffness and transverse stiffness of the vehicle.

The first intermediate crossmember may support a pair of rear side members through a mechanical joint system, and each rear side member may be connected to a rear portion of a corresponding side sill.

The pair of rear side members individually connected to the pair of side sills may be supported by the first intermediate crossmember so that an impact load (impact energy) generated during a rear collision of the vehicle may be sufficiently supported.

The rear side member may have an opening provided in a front portion thereof, and each end portion of the first intermediate crossmember may be fitted into the opening of the corresponding rear side member.

Each end portion of the first intermediate crossmember may be fitted into the opening of the corresponding rear side member, thereby forming a mechanical joint system between the rear side member and the end portion of the first intermediate crossmember. Thus, both end portions of the first intermediate crossmember may stably support the pair of rear side members in a longitudinal direction of the vehicle.

A front end face of the rear side member may be fixed to a rear surface of the first intermediate crossmember adjacent to each end portion of the first intermediate crossmember.

Accordingly, the first intermediate crossmember may stably support the pair of rear side members in the longitudinal direction of the vehicle.

According to an exemplary embodiment, the rear side member may include a top retention portion extending from a top end of the front end face to the first intermediate crossmember, the top retention portion may be fixed to a top surface of the first intermediate crossmember, and the opening may have an L-shaped cross section defined by the top retention portion and the front end face.

The opening of the L-shaped cross section may be joined and supported to the top surface and rear surface of the first intermediate crossmember so that each rear side member may be stably supported with respect to the first intermediate crossmember.

According to another exemplary embodiment, the rear side member may include a top retention portion extending from a top end of the front end face to the first intermediate crossmember, and a bottom retention portion extending from a bottom end of the front end face to the first intermediate crossmember. The top retention portion may be fixed to a top surface of the first intermediate crossmember, the bottom retention portion may be fixed to a bottom surface of the first intermediate crossmember, and the opening may have a U-shaped cross section defined by the top retention portion, the front end face, and the bottom retention portion.

The opening of the U-shaped cross section may be joined and supported to the top surface, bottom surface, and rear surface of the first intermediate crossmember so that each rear side member may be stably supported with respect to the first intermediate crossmember.

The top retention portion may have a top recess which is recessed from a top surface of the top retention portion toward the first intermediate crossmember, and the bottom retention portion may have a bottom recess which is recessed from a bottom surface of the bottom retention portion toward the first intermediate crossmember.

Accordingly, each of the top retention portion and the bottom retention portion may increase stiffness by the top recess and the bottom recess so that joint stiffness between the top retention portion and the bottom retention portion of the rear side member and the first intermediate crossmember may be significantly improved.

The first intermediate crossmember may further include a retention portion extending from a top end of each end face thereof to the corresponding side sill, and the retention portion may be fixed to a top surface of the side sill.

Accordingly, the first intermediate crossmember may be stably supported with respect to the corresponding side sill in a height direction of the vehicle through the retention portion.

The first intermediate crossmember may be supported with respect to the pair of side sills through a pair of support brackets, respectively, and each support bracket may connect a bottom surface of the first intermediate crossmember adjacent to the end face of the first intermediate crossmember and the inboard side surface of the corresponding side sill.

Accordingly, the pair of support brackets may stably support a vertical load acting on the pair of side sills and the first intermediate crossmember.

Each support bracket may include a first fixed surface which is fixed to the inboard side surface of the corresponding side sill, and a second fixed surface which is fixed to the bottom surface of the first intermediate crossmember.

Accordingly, the bottom surface of the first intermediate crossmember adjacent to the end face of the first intermediate crossmember may be firmly supported with respect to the corresponding side sill through the corresponding support bracket.

The support bracket may further include an inclined surface extending obliquely between a bottom end of the first fixed surface and an inboard-side end of the second fixed surface.

Accordingly, the first intermediate crossmember may be stably supported in a diagonal direction by the inclined surface of the support bracket.

The first intermediate crossmember may have a closed cross section, and the first intermediate crossmember may be made of a high-tensile strength steel plate.

As the first intermediate crossmember is made of a high-tensile strength steel plate to have a closed cross section, the first intermediate crossmember may increase support stiffness with respect to the rear side members and the side sills.

The vehicle intermediate structure may further include a second intermediate crossmember connected to the first intermediate crossmember. The second intermediate crossmember may include a center portion extending in the width direction of the vehicle and a pair of bent portions provided on both ends of the center portion. Each bent portion may be fixed to each end portion of the first intermediate crossmember and the corresponding rear side member.

A front surface of the bent portion may be fixed to the end portion of the first intermediate crossmember, and an outboard side surface of the bent portion may be fixed to an inboard side surface of the rear side member.

The bent portion of the second intermediate crossmember may be fixed to the end portion of the first intermediate crossmember and the front portion of the rear side member so that the second intermediate crossmember may connect the end portion of the first intermediate crossmember and the front portion of the rear side member. Thus, the second intermediate crossmember may support the overall torsional stiffness of the vehicle.

The center portion may be located higher than the first intermediate crossmember, and the bent portion may be bent from each end of the center portion toward the first intermediate crossmember.

A longitudinal axis of the center portion may be parallel to a longitudinal axis of the first intermediate crossmember, and a longitudinal axis of the bent portion may be perpendicular to the longitudinal axis of the center portion.

A cross section of the center portion of the second intermediate crossmember may be uniform in a longitudinal direction thereof, and a cross section of the bent portion of the second intermediate crossmember may be uniform in a longitudinal direction thereof.

The cross section of the center portion may be the same as the cross section of the bent portion.

The second intermediate crossmember may be made of a mass-produced steel pipe having a closed cross section.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
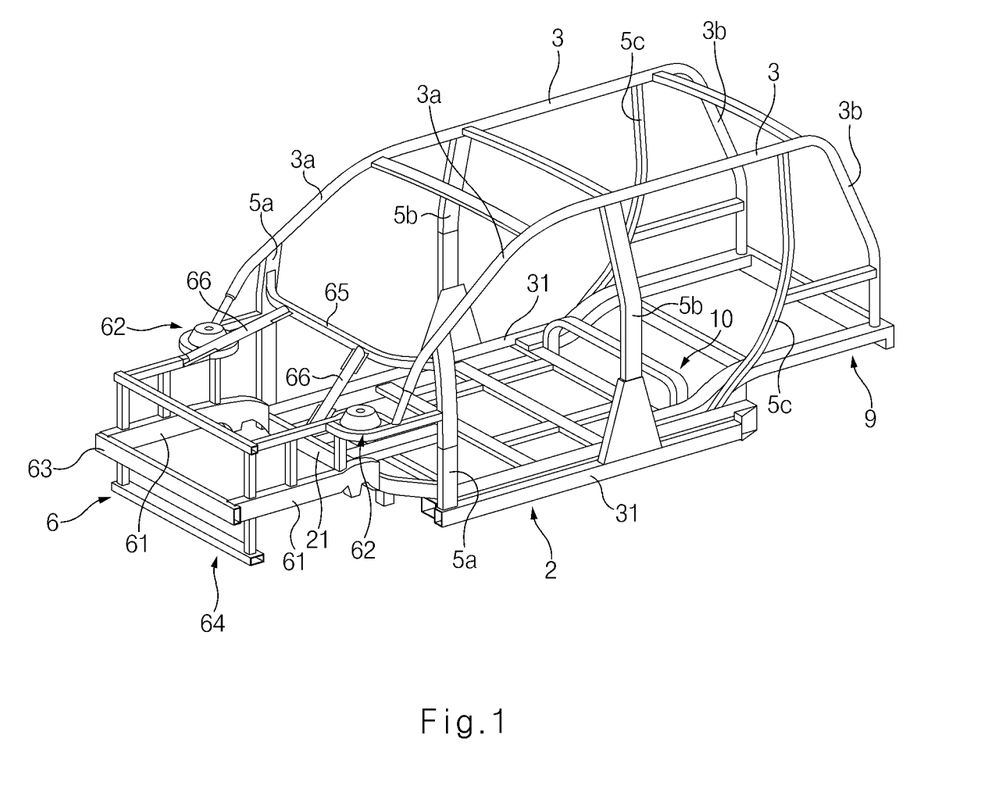
FIG. 1 illustrates a perspective view of a vehicle frame on which an intermediate structure according to an exemplary embodiment of the present disclosure is mounted.

FIG. 1 illustrates a vehicle frame on which an intermediate structure according to an exemplary embodiment of the present disclosure is mounted.

Referring to FIG. 1, the vehicle frame may include a center frame module 2, a front structure 6 connected to the front of the center frame module 2, a rear frame module 9 connected to the rear of the center frame module 2, and an intermediate structure 10 disposed between the center frame module 2 and the rear frame module 9.

A pair of front pillars 5*a* may extend from the front of the center frame module 2 in a height direction of the vehicle, and the pair of front pillars 5*a* may be spaced apart from each other in a width direction of the vehicle.

A pair of center pillars 5*b* may extend from the center of the center frame module 2 in the height direction of the vehicle, and the pair of center pillars 5*b* may be spaced apart from each other in the width direction of the vehicle.

A pair of rear pillars 5*c* may extend from the rear of the center frame module 2 in the height direction of the vehicle, and the pair of rear pillars 5*c* may be spaced apart from each other in the width direction of the vehicle.

A pair of roof rails 3 may be disposed above the center frame module 2, and each roof rail 3 may extend in a longitudinal direction of the vehicle. Each roof rail 3 may connect a top end of the corresponding front pillar 5*a*, a top end of the corresponding center pillar 5*b*, and a top end of the corresponding rear pillar 5*c*. Each roof rail 3 may have a front extension portion 3*a* extending obliquely from a front end thereof and a rear extension portion 3*b* extending obliquely from a rear end thereof.

Figure 4:
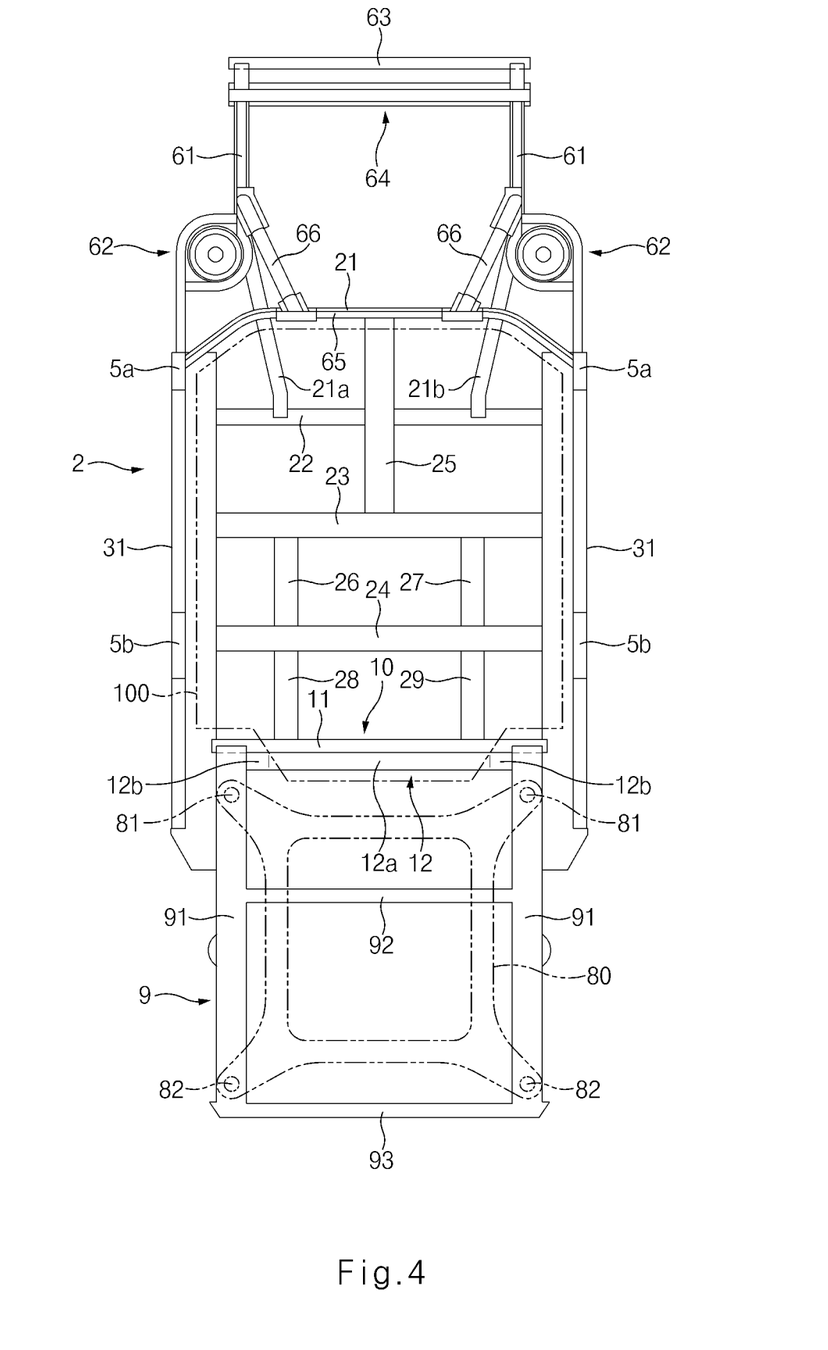
FIG. 4 illustrates a plan view of a vehicle frame including an intermediate structure according to an exemplary embodiment of the present disclosure.

Referring to FIG. 4, the center frame module 2 may include a plurality of crossmembers 21, 22, 23, and 24, and a plurality of longitudinal members 21*a*, 21*b*, 25, 26, 27, 28, and 29. The center frame module 2 may include a pair of side sills 31 disposed on both side edges thereof, respectively. The pair of side sills 31 may be spaced apart from each other in the width direction of the vehicle, and each side sill 31 may extend in the longitudinal direction of the vehicle. The side sill 31 may include an inboard side surface facing the interior of the vehicle, an outboard side surface facing the exterior of the vehicle, a top surface facing the top of the vehicle, and a bottom surface facing the bottom of the vehicle.

The plurality of crossmembers 21, 22, 23, and 24 may include a dash crossmember 21 mounted on a dash panel, a front crossmember 22 located behind the dash crossmember 21, a first seat crossmember 23 located behind the front crossmember 22, and a second seat crossmember 24 located behind the first seat crossmember 23. The front crossmember 22, the first seat crossmember 23, and the second seat crossmember 24 may extend in the width direction of the vehicle. The front crossmember 22, the first seat crossmember 23, and the second seat crossmember 24 may be parallel to each other.

The dash crossmember 21 may block the dash panel from intruding into a passenger compartment in the event of a front collision of the vehicle. Referring to FIG. 1, the dash crossmember 21 may connect lower portions of the pair of front pillars 5*a* in the width direction of the vehicle. The dash crossmember 21 may be mounted under the dash panel, and the dash panel may serve as a partition between a front compartment and the passenger compartment. In addition, both end portions of the dash crossmember 21 may be joined to the pair of side sills 31 using fasteners, welding, and/or the like, respectively. According to an exemplary embodiment, the dash crossmember 21 may be made of a mass-produced steel pipe having an angular cross section or a circular cross section with a cavity defined therein, and accordingly the dash crossmember 21 may have a closed cross section. For example, the mass-produced steel pipe may be SGH400, SGH490, or the like.

The front crossmember 22 may be spaced apart from the dash crossmember 21 toward the rear of the vehicle and may be adjacent to a front end of the center frame module 2. Both end portions of the front crossmember 22 may be joined to the pair of side sills 31, respectively.

The front crossmember 22 may have an angular cross section or a circular cross section with a cavity defined therein, and accordingly the front crossmember 22 may have a closed cross section. According to an exemplary embodiment, the front crossmember 22 may be made of a high-tensile strength steel plate such as SPFC1180Y through hot stamping, hot forming, press hardening, and/or roll forming. Accordingly, the high-strength front crossmember 22 may improve crashworthiness and stiffness of the center frame module 2, thereby safely protecting a battery and the passenger compartment in the event of a collision of the vehicle.

The first seat crossmember 23 may be spaced apart from the front crossmember 22 toward the rear of the vehicle and may be located in the middle of the center frame module 2. A vehicle seat may be mounted on the first seat crossmember 23 through brackets, and thus the first seat crossmember 23 may support the vehicle seat.

The first seat crossmember 23 may have an angular cross section or a circular cross section with a cavity defined therein, and accordingly the first seat crossmember 23 may have a closed cross section. According to an exemplary embodiment, the first seat crossmember 23 may be made of a high-tensile strength steel plate such as SPFC1180Y through hot stamping, hot forming, press hardening, and/or roll forming. Accordingly, the high-strength first seat crossmember 23 may improve crashworthiness and stiffness of the center frame module 2, thereby safely protecting the battery and the passenger compartment in the event of a collision of the vehicle.

The second seat crossmember 24 may be spaced apart from the first seat crossmember 23 toward the rear of the vehicle and may be adjacent to a rear end of the center frame module 2. A vehicle seat may be mounted on the second seat crossmember 24 through brackets, and thus the second seat crossmember 24 may support the vehicle seat.

The second seat crossmember 24 may have an angular cross section or a circular cross section with a cavity defined therein, and accordingly the second seat crossmember 24 may have a closed cross section. According to an exemplary embodiment, the second seat crossmember 24 may be made of a high-tensile strength steel plate such as SPFC1180Y through hot stamping, hot forming, press hardening, and/or roll forming. Accordingly, the high-strength second seat crossmember 24 may improve crashworthiness and stiffness of the center frame module 2, thereby safely protecting the battery and the passenger compartment in the event of a collision of the vehicle.

Referring to FIG. 4, the plurality of longitudinal members 21a, 21b, 25, 26, 27, 28, and 29 may include a pair of rear lower members 21a and 21b extending from the dash crossmember 21 to the front crossmember 22, a center longitudinal member 25 extending from the dash crossmember 21 to the first seat crossmember 23, a pair of first side longitudinal members 26 and 27 extending from the first seat crossmember 23 to the second seat crossmember 24, and a pair of second side longitudinal members 28 and 29 extending from the second seat crossmember 24 to the intermediate structure 10.

The pair of rear lower members 21a and 21b may be spaced apart from each other in the width direction of the vehicle, and each of the rear lower members 21a and 21b may extend in the longitudinal direction of the vehicle. According to an exemplary embodiment, the rear lower members 21a and 21b may be made of a high-tensile strength steel plate such as SPFC1470 through hot stamping, hot forming, press hardening, and/or roll forming, whereby front crash performance (crashworthiness) of the vehicle may be improved, and thus the battery and the passenger compartment may be safely protected in the event of a front collision.

The center longitudinal member 25 may extend in a central longitudinal axis of the vehicle.

The pair of first side longitudinal members 26 and 27 may be spaced apart from each other in the width direction of the vehicle, and each of the first side longitudinal members 26 and 27 may extend in the longitudinal direction of the vehicle. A front end of each of the first side longitudinal members 26 and 27 may be joined to the first seat crossmember 23 using fasteners, welding, and/or the like, and a rear end of each of the first side longitudinal members 26 and 27 may be joined to the second seat crossmember 24 using fasteners, welding, and/or the like.

The pair of second side longitudinal members 28 and 29 may be spaced apart from each other in the width direction of the vehicle, and each of the second side longitudinal members 28 and 29 may extend in the longitudinal direction of the vehicle. A front end of each of the second side longitudinal members 28 and 29 may be joined to the second seat crossmember 24 using fasteners, welding, and/or the like, and a rear end of each of the second side longitudinal members 28 and 29 may be joined to the intermediate structure 10 using fasteners, welding, and/or the like.

The second side longitudinal members 28 and 29 may be aligned with the corresponding first side longitudinal members 26 and 27 in the longitudinal direction of the vehicle. In particular, the front ends of the second side longitudinal members 28 and 29 and the rear ends of the corresponding first side longitudinal members 26 and 27 may face each other with the second seat crossmember 24 placed therebetween. A longitudinal axis of each of the second side longitudinal members 28 and 29 may be aligned with a longitudinal axis of each of the corresponding first side longitudinal members 26 and 27.

According to an exemplary embodiment, the center longitudinal member 25, the first side longitudinal members 26 and 27, and the second side longitudinal members 28 and 29 may be made of a mass-produced steel pipe having an angular cross section or a circular cross section with a cavity defined therein, and accordingly the center longitudinal member 25, the first side longitudinal members 26 and 27, and the second side longitudinal members 28 and 29 may have a closed cross section. For example, the mass-produced steel pipe may be SGH400, SGH490, or the like.

Referring to FIGS. 1 and 4, the front structure 6 may be connected to the center frame module 2, the pair of front pillars 5a, and the pair of front extension portions 3a. The front structure 6 may include a pair of front side members 61, a pair of fender upper members 62 located above the pair of front side members 61, respectively, a bumper back beam 63 connecting front ends of the pair of front side members 61, a front end module 64 connected to the pair of front side members 61 and the pair of fender upper members 62, and an upper crossmember 65 connecting the pair of front pillars 5a.

The pair of front side members 61 may be spaced apart from each other in the width direction of the vehicle on the front of the vehicle, and each front side member 61 may extend in the longitudinal direction of the vehicle. The front side member 61 may extend from the dash crossmember 21 of the center frame module 2 to the front of the vehicle. A rear end of the front side member 61 may be joined to the dash crossmember 21 of the center frame module 2 using fasteners, welding, and/or the like, and the front end of the front side member 61 may be joined to a corresponding end portion of the bumper back beam 63 using fasteners, welding, and/or the like.

The pair of fender upper members 62 may be spaced apart from each other in the width direction of the vehicle, and each fender upper member 62 may extend in the longitudinal direction of the vehicle. Each fender upper member 62 may be upwardly spaced apart from the corresponding front side member 61.

The bumper back beam 63 may extend in the width direction of the vehicle, and the bumper back beam 63 may connect the front ends of the pair of front side members 61. Each end portion of the bumper back beam 63 may be joined to the front end of the corresponding front side member 61. According to an exemplary embodiment, the bumper back beam 63 may be made of a high-tensile strength steel plate through hot stamping, hot forming, press hardening, and/or roll forming.

The front end module 64 may be a frame supporting a heat exchanger such as a radiator, a condenser, and an intercooler.

The upper crossmember 65 may extend in the width direction of the vehicle, and each end portion of the upper crossmember 65 may be joined to the corresponding front pillar 5a. Referring to FIG. 1, a pair of strut bars 66 may extend from the upper crossmember 65 to the pair of fender upper members 62, respectively, and the pair of strut bars 66 may be spaced apart from each other in a longitudinal direction of the upper crossmember 65. A top end of each strut bar 66 may be joined to a portion of the upper crossmember 65 adjacent to the end portion of the upper crossmember 65, and a bottom end of each strut bar 66 may be joined to the corresponding fender upper member 62. That is, the pair of fender upper members 62 may be connected to the upper crossmember 65 through the pair of strut bars 66.

Referring to FIG. 4, the rear frame module 9 may include a pair of rear side members 91, a rear crossmember 92 connecting the pair of rear side members 91, and a rear back beam 93 connecting rear ends of the rear side members 91.

The pair of rear side members 91 may be spaced apart from each other in the width direction of the vehicle on the rear of the vehicle, and each rear side member 91 may extend in the longitudinal direction of the vehicle. Each rear side member 91 may extend from a rear portion of the corresponding side sill 30 to the rear of the vehicle, and a front portion of the rear side member 91 may be joined to the inboard side surface of the rear portion of the corresponding side sill 30 using fasteners, welding, and/or the like. That is, the pair of rear side members 91 may be connected to the inboard side surfaces of the pair of side sills 30, respectively. The rear crossmember 92 and the rear back beam 93 may extend in the width direction of the vehicle.

The vehicle frame according to an exemplary embodiment of the present disclosure may further include a rear subframe 80 mounted on the rear frame module 9. The rear subframe 80 may include a pair of front mounting portions 81 mounted on the front portions of the pair of rear side members 91, respectively, and a pair of rear mounting portions 82 mounted on the rear portions of the pair of rear side members 91, respectively.

Most of the members constituting the center frame module 2, the front structure 6, and the rear frame module 9 may be made of the mass-produced steel pipes each having an angular cross section or a circular cross section with a cavity defined therein, and accordingly each member may have a closed cross section. Thus, the vehicle frame according to an exemplary embodiment of the present disclosure may form a space frame.

According to an exemplary embodiment, the rear back beam 93 may be made of a high-tensile strength steel plate through hot stamping, hot forming, press hardening, and/or roll forming.

The rear frame module 9 may be located higher than the center frame module 2, and the intermediate structure 10 may connect the center frame module 2 and the rear frame module 9.

The intermediate structure 10 may include a first intermediate crossmember 11 connecting the pair of side sills 31 in the width direction of the vehicle.

Figure 7:
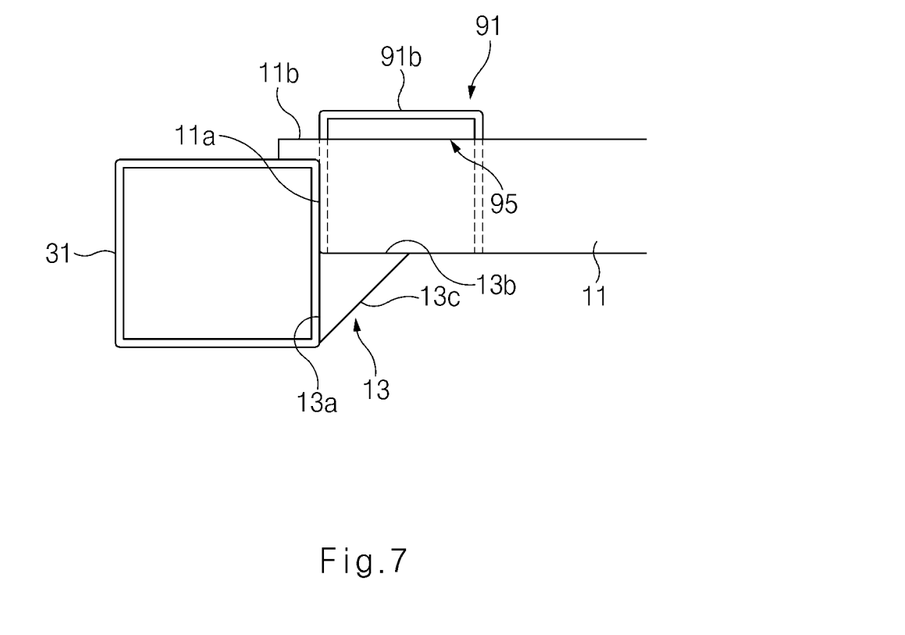
FIG. 7 illustrates a cross-sectional view, taken along line C-C of FIG. 5.

Referring to FIG. 7, the first intermediate crossmember 11 may extend in the width direction of the vehicle, and both end faces 11a of the first intermediate crossmember 11 may be attached to the pair of side sills 31, respectively. Each end face 11a of the first intermediate crossmember 11 may be flat to match the inboard side surface of the corresponding side sill 31, and the end face 11a of the first intermediate crossmember 11 may be directly attached to the inboard side surface of the corresponding side sill 31 using fasteners, welding, and/or the like. Thus, the vehicle frame may achieve enough transverse stiffness using the first intermediate crossmember 11.

Referring to FIG. 7, the first intermediate crossmember 11 may further include a retention portion 11b extending from a top end of each end face 11a to the corresponding side sill 31. The retention portion 11b may be attached to the top surface of the side sill 31 using fasteners, welding, and/or the like, and accordingly the first intermediate crossmember 11 may be stably supported with respect to the corresponding side sill 31 in the height direction of the vehicle through the retention portion 11b.

Both end portions of the first intermediate crossmember 11 may be supported with respect to the pair of side sills 31 through a pair of support brackets 13, respectively. Each support bracket 13 may connect a bottom surface of the first intermediate crossmember 11 adjacent to the end face 11a and the inboard side surface of the corresponding side sill 31. Thus, the pair of support brackets 13 may support a vertical load acting on the first intermediate crossmember 11 and the side sills 31.

Each support bracket 13 may include a first fixed surface 13a which is fixed to the side sill 31 and a second fixed surface 13b which is fixed to the bottom surface of the first intermediate crossmember 11.

The first fixed surface 13a may be vertically flat to match the inboard side surface of the side sill 31, and the first fixed surface 13a may be fixed to the inboard side surface of the corresponding side sill 31 using fasteners, welding, and/or the like. The second fixed surface 13b may be horizontally flat to match the bottom surface of the first intermediate crossmember 11, and the second fixed surface 13b may be fixed to the bottom surface of the corresponding first intermediate crossmember 11 using fasteners, welding, and/or the like. Accordingly, the bottom surface of the first intermediate crossmember 11 adjacent to each end face 11a of the first intermediate crossmember 11 may be firmly supported with respect to the corresponding side sill 31 through the support bracket 13.

In addition, each support bracket 13 may further include an inclined surface 13c extending obliquely between a bottom end of the first fixed surface 13a and an inboard-side end of the second fixed surface 13b. Accordingly, the first intermediate crossmember 11 may be stably supported with respect to the side sill 31 through the inclined surface 13c of the support bracket 13.

Figure 2:
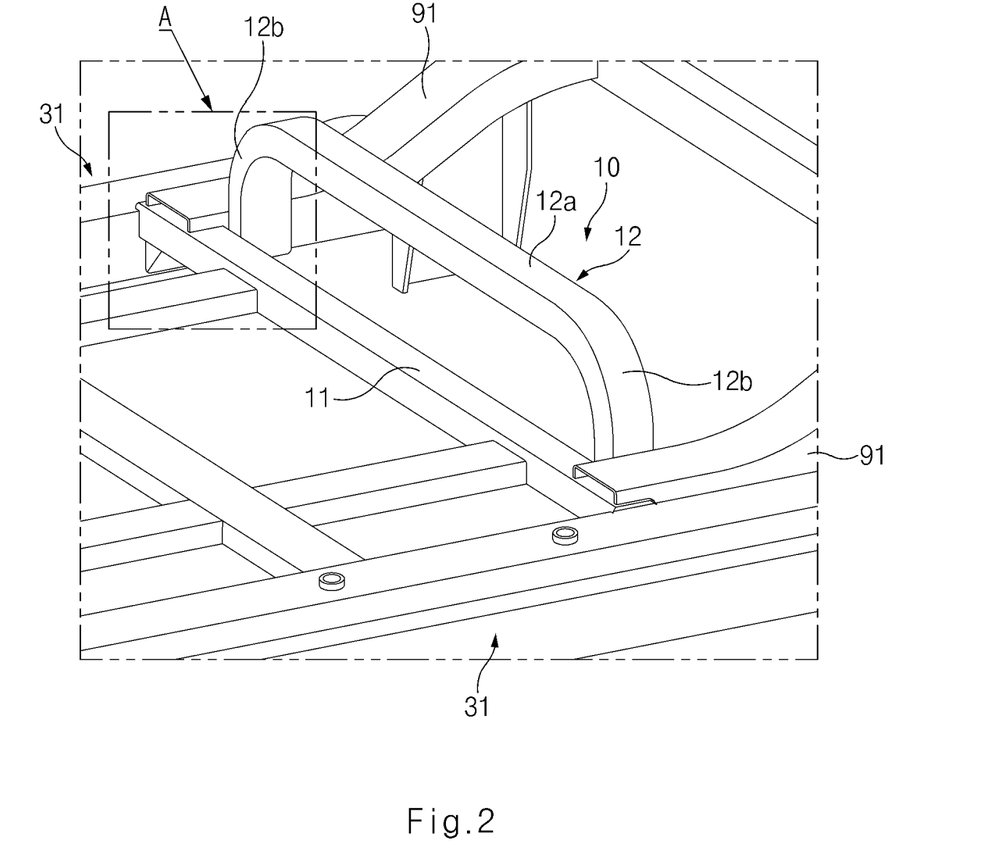
FIG. 2 illustrates a perspective view of an intermediate structure according to an exemplary embodiment of the present disclosure.
Figure 3:
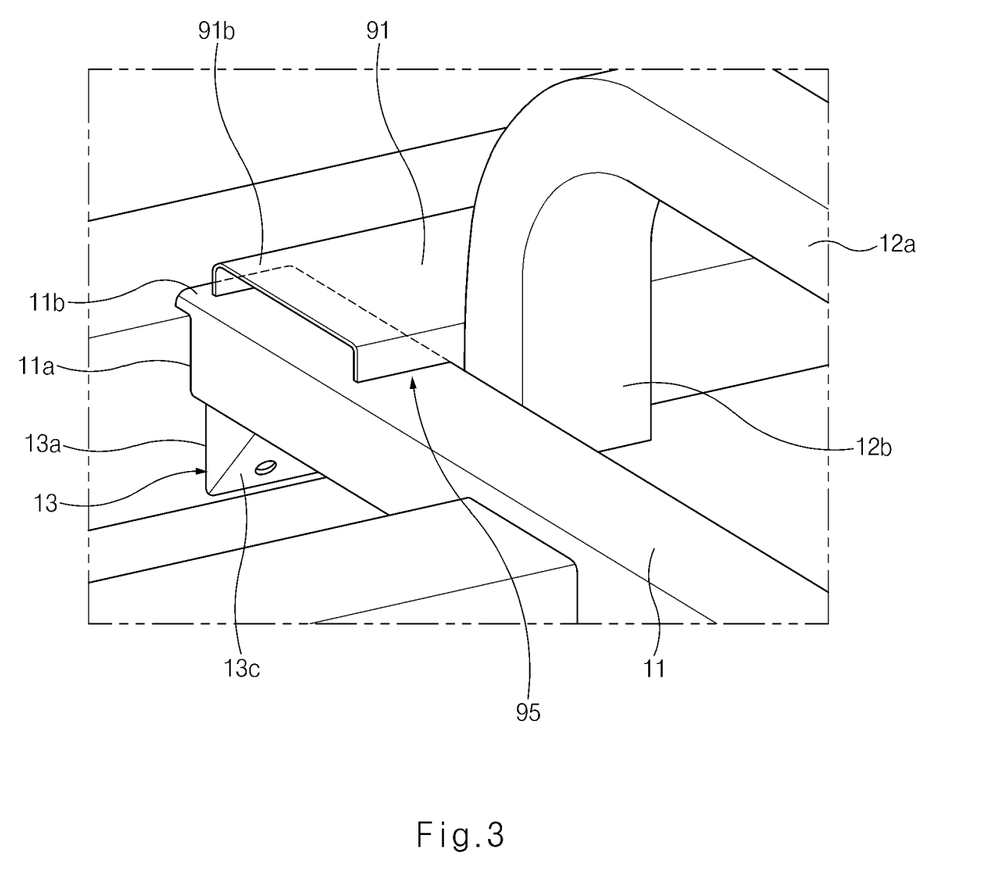
FIG. 3 illustrates an enlarged view of portion A of FIG. 2.

Referring to FIGS. 2 and 4, the pair of rear side members 91 may be connected to the first intermediate crossmember 11 through a mechanical joint system so that the first intermediate crossmember 11 may connect the pair of rear side members 91 in the width direction of the vehicle. Each end portion of the first intermediate crossmember 11 may support the corresponding rear side member 91 in the longitudinal direction of the vehicle.

Figure 6:
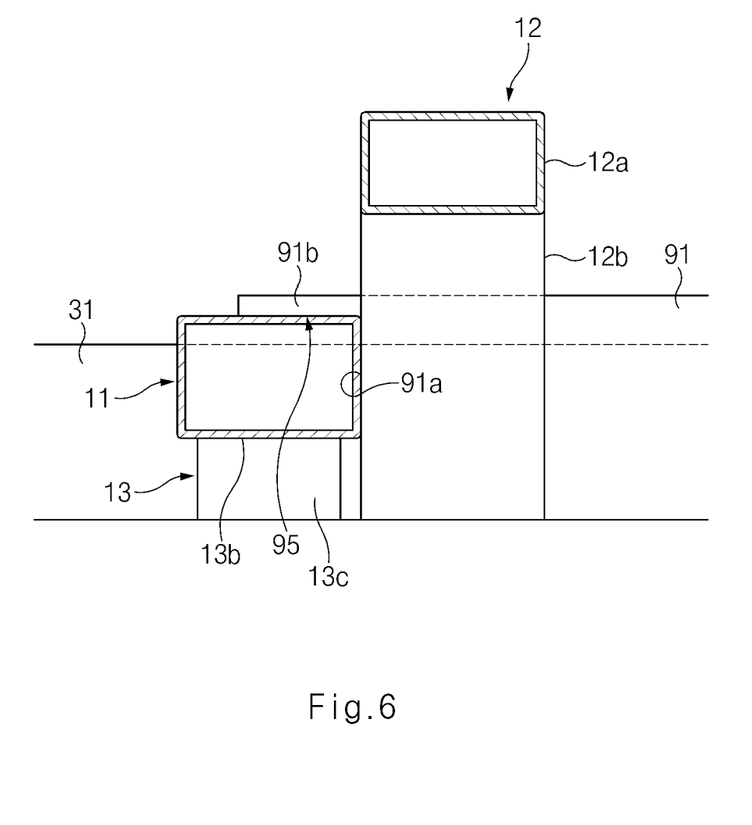
FIG. 6 illustrates a cross-sectional view, taken along line B-B of FIG. 5.
Figure 8:
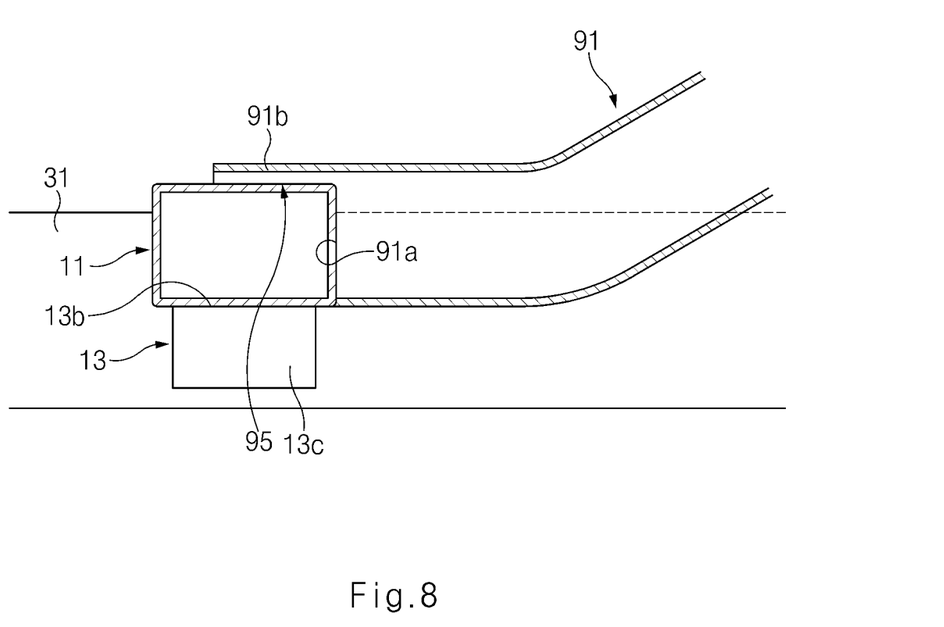
FIG. 8 illustrates a cross-sectional view, taken along line D-D of FIG. 5.

Referring to FIGS. 6 and 8, a front end face 91a of each rear side member 91 may be directly fixed to a rear surface of the first intermediate crossmember 11 adjacent to each end portion of the first intermediate crossmember 11 by welding ($CO_2$ welding or the like), using fasteners, and/or the like. Each rear side member 91 may extend in the longitudinal direction of the vehicle, and the first intermediate crossmember 11 may extend in the width direction of the vehicle so that a longitudinal axis of the rear side member 91 may be perpendicular to a longitudinal axis of the first intermediate crossmember 11. Thus, the pair of rear side members 91 may be stably supported to both end portions of the first intermediate crossmember 11.

Referring to FIGS. 6 and 8, each rear side member 91 may include a top retention portion 91b extending from a top end of the front end face 91a to the first intermediate crossmember 11, and the top retention portion 91b may be fixed to a top surface of the first intermediate crossmember 11 by welding ($CO_2$ welding or the like), using fasteners, and/or the like.

Referring to FIGS. 6 and 8, each rear side member 91 may have an opening 95 provided in the front portion thereof, and the opening 95 may be precisely formed in the front portion of the rear side member 91 by laser processing. The opening 95 of the rear side member 91 may have an L-shaped cross section which is complementary to at least a portion of the exterior of the first intermediate crossmember 11. The opening 95 of the L-shaped cross section may be defined by the top retention portion 91b and the front end face 91a. Each end portion of the first intermediate crossmember 11 may be fitted into the opening 95 of the corresponding rear side member 91, and the end portion of the first intermediate crossmember 11 may be fixed to the opening 95 of the rear side member 91 by $CO_2$ welding or the like. The opening 95 of the L-shaped cross section may be joined and supported to the top surface and rear surface of the first intermediate crossmember 11 so that each rear side member 91 may be stably supported with respect to the first intermediate crossmember 11, thereby forming a mechanical joint system between each rear side member 91 and the corresponding end portion of the first intermediate crossmember 11.

In particular, the openings 95 of the pair of rear side members 91 may be fitted and fixed into both end portions of the first intermediate crossmember 11, respectively, so that the rear side members 91 may be stably supported by the first intermediate crossmember 11 in the longitudinal direction of the vehicle. In the event of a rear collision, the first intermediate crossmember 11 may sufficiently support a load transmitted from the rear side members 91, thereby preventing the rear subframe 80 mounted on the rear frame module 9 from moving into the battery 100.

In addition, both end faces 11a of the first intermediate crossmember 11 may be fixed to the pair of side sills 31, respectively, and the pair of rear side members 91 may be fixed to both end portions of the first intermediate crossmember 11, respectively, so that the first intermediate crossmember 11 may connect the side sills 31, the rear side members 91, and the other components, thereby improving the overall joint stiffness of the vehicle.

A cross section of the first intermediate crossmember 11 may be uniform in a longitudinal direction thereof (in the width direction of the vehicle), and accordingly the first intermediate crossmember 11 may have the same cross-sectional area in the longitudinal direction thereof, thereby improving torsional stiffness and transverse stiffness of the vehicle. Referring to FIG. 6, the first intermediate crossmember 11 may have an angular cross section or a circular cross section with a cavity defined therein, and accordingly the first intermediate crossmember 11 may have a closed cross section.

According to an exemplary embodiment, the first intermediate crossmember 11 may be made of a high-tensile strength steel plate through hot stamping, hot forming, press hardening, and/or roll forming. Accordingly, the first intermediate crossmember 11 may increase support stiffness with respect to the rear side members 91 and the side sills 31.

Figure 9:
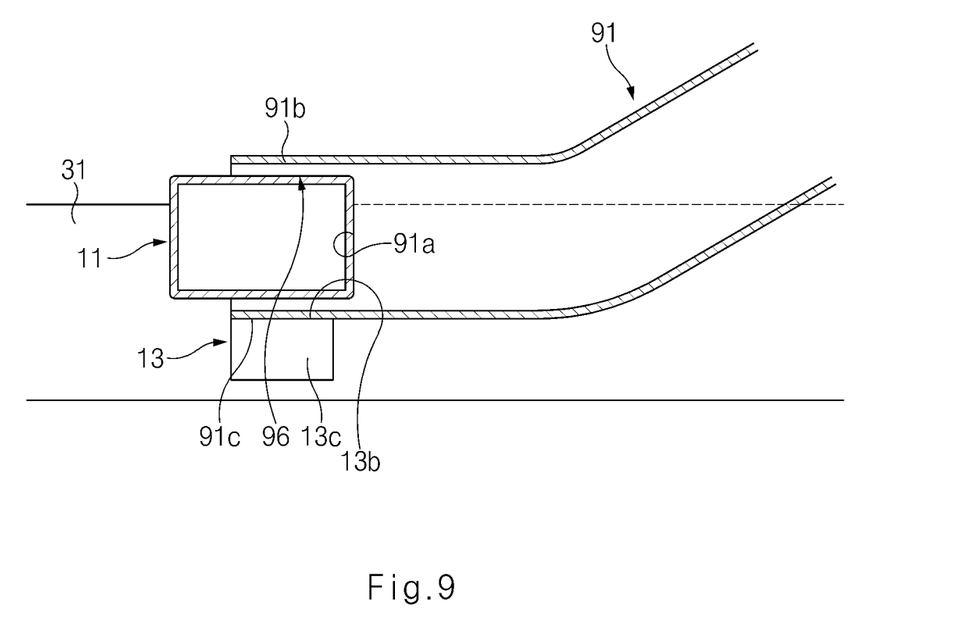
FIG. 9 illustrates a modification to the embodiment of FIG. 8.

FIG. 9 illustrates an alternative to the mechanical joint system between the front portion of the rear side member 91 and the first intermediate crossmember 11.

Referring to FIG. 9, each rear side member 91 may further include a bottom retention portion 91c extending from a bottom end of the front end face 91a to the first intermediate crossmember 11, and the bottom retention portion 91c may be fixed to the bottom surface of the first intermediate crossmember 11 by welding ($CO_2$ welding or the like), using fasteners, and/or the like. An opening 96 provided in the front portion of the rear side member 91 may be defined by the front end face 91a, the top retention portion 91b, and the bottom retention portion 91c, and the opening 96 of the rear side member 91 may have a U-shaped cross section which is complementary to at least a portion of the exterior of the first intermediate crossmember 11. Each end portion of the first intermediate crossmember 11 may be fitted into the opening 96 of the corresponding rear side member 91, and the end portion of the first intermediate crossmember 11 may be fixed to the opening 96 of the rear side member 91 by $CO_2$ welding or the like. The opening 96 of the U-shaped cross section may be joined and supported to the top surface, bottom surface, and rear surface of the first intermediate crossmember 11 so that each rear side member 91 may be stably supported with respect to the first intermediate crossmember 11, thereby forming a mechanical joint system between each rear side member 91 and the corresponding end portion of the first intermediate crossmember 11.

The second fixed surface 13b of the support bracket 13 may be fixed to a bottom surface of the bottom retention portion 91c of the rear side member 91.

The other components in this exemplary embodiment may be the same as or similar to those in the exemplary embodiment illustrated in FIGS. 6 and 8.

Figure 10:
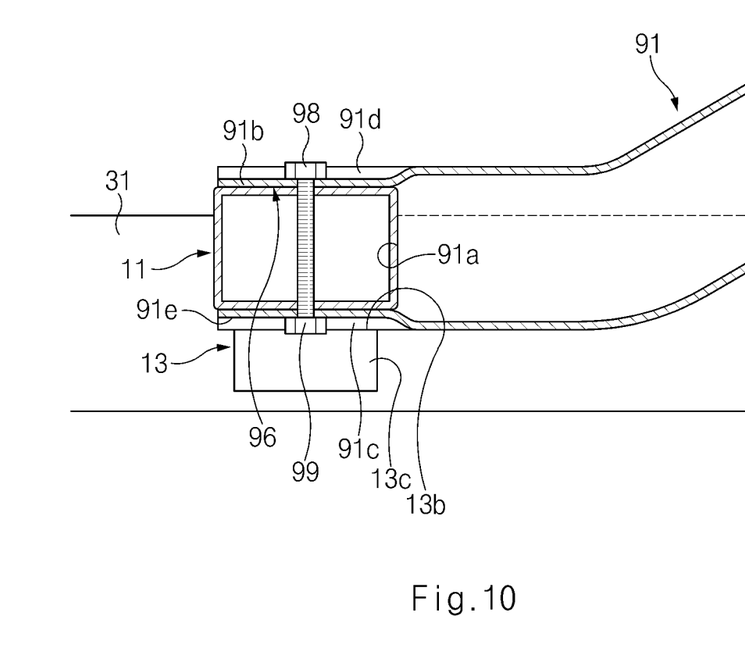
FIG. 10 illustrates a modification to the embodiment of FIG. 8.

Referring to FIG. 10, the top retention portion 91b may have a top recess 91d, and the top recess 91d may be recessed from a top surface of the top retention portion 91b toward the first intermediate crossmember 11. The bottom retention portion 91c may have a bottom recess 91e, and the bottom recess 91e may be recessed from the bottom surface of the bottom retention portion 91c toward the first intermediate crossmember 11. Accordingly, each of the top retention portion 91b and the bottom retention portion 91c may increase stiffness by the top recess 91d and the bottom recess 91e so that joint stiffness between the top retention portion 91b and the bottom retention portion 91c of the rear side member 91 and the first intermediate crossmember 11 may be significantly improved. In addition, the top retention portion 91b and the bottom retention portion 91c may be fixed to the end portion of the first intermediate crossmember 11 using fasteners such as a bolt 98 and a nut 99.

Figure 5:
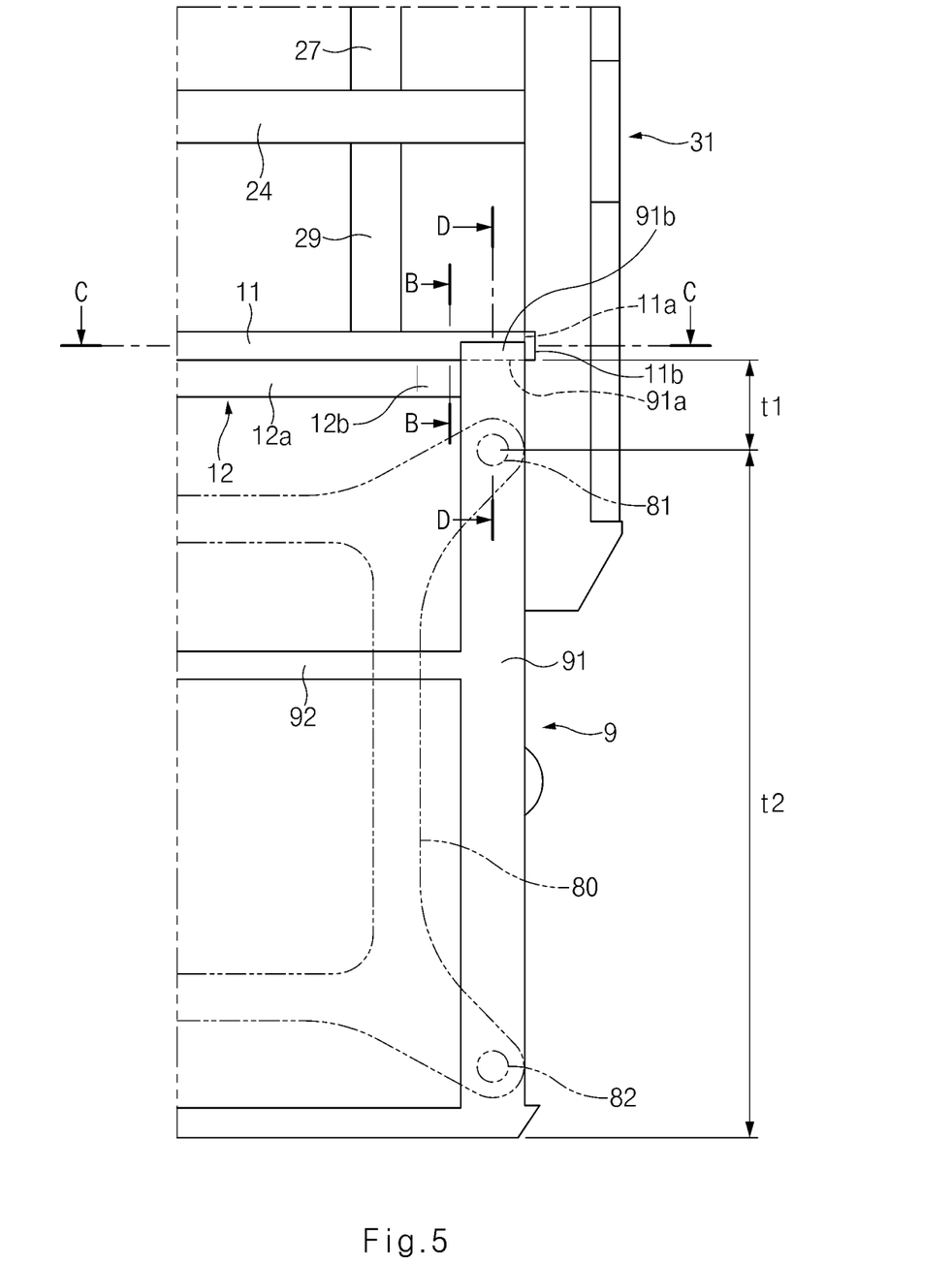
FIG. 5 illustrates a right plan view of the intermediate structure of the vehicle frame illustrated in FIG. 4.

Referring to FIG. 5, each front mounting portion 81 of the rear subframe 80 may be spaced apart from the end portion of the first intermediate crossmember 11 and the front end face 91a of the rear side member 91 by a predetermined distance, and each rear side member 91 may be divided into a first section t1 located in front of the front mounting portion 81 and a second section t2 located behind the front mounting portion 81 on the basis of the front mounting portion 81 of the rear subframe 80. The first section t1 may be a portion of the rear side member 91 between the front mounting portion 81 of the rear subframe 80 and the front end face 91a of the rear side member 91. The second section t2 may be a portion of the rear side member 91 between the front mounting portion 81 of the rear subframe 80 and the rear end of the rear side member 91.

As the first intermediate crossmember 11 is made of a material having relatively high stiffness, and the first intermediate crossmember 11 and the pair of rear side members 91 are connected through the mechanical joint system, the first section t1 of the rear side member 91 may serve as a stiffness section in which stiffness is improved by the mechanical joint system between the first intermediate crossmember 11 and the front end of the rear side member 91. In the event of a rear collision of the vehicle, deformation in the first section t1 of the rear side member 91 may be relatively minimized, and deformation in the second section t2 of the rear side member 91 may be greater than that in the first section t1. As the second section t2 of the rear side member 91 is significantly deformed and the first section t1 of the rear side member 91 is less deformed than the second section t2 of the rear side member 91, the first section t1 of the rear side member 91 may sufficiently support an impact load so that a rear portion of the battery 100 may be relatively less deformed (bent), the rear subframe 80 may be prevented from directly hitting the rear portion of the battery 100, the rear subframe 80 may be prevented from intruding into the rear of the passenger compartment, and a cable of the battery 100 may be prevented from being bent to thereby reduce the risk of fire.

Referring to FIG. 2, the intermediate structure 10 according to an exemplary embodiment of the present disclosure may further include a second intermediate crossmember 12 connected to the first intermediate crossmember 11. The second intermediate crossmember 12 may support a rear seat and secure mounting stiffness of the rear seat.

The second intermediate crossmember 12 may include a center portion 12a extending in the width direction of the vehicle and a pair of bent portions 12b provided on both ends of the center portion 12a. The center portion 12a may be located higher than the first intermediate crossmember 11, and each bent portion 12b may be bent from each end of the center portion 12a toward the first intermediate crossmember 11 and the rear side member 91. A longitudinal axis of the center portion 12a may be parallel to the longitudinal axis of the first intermediate crossmember 11, and a longitudinal axis of the bent portion 12b may be perpendicular to the longitudinal axis of the center portion 12a.

Each bent portion 12b may include an outboard side surface facing the exterior of the vehicle, an inboard side surface facing the interior of the vehicle, a front surface facing the front of the vehicle, and a rear surface facing the rear of the vehicle. The front surface of the bent portion 12b may be fixed to the end portion of the first intermediate crossmember 11 using fasteners, welding, and/or the like. The outboard side surface of the bent portion 12b may be fixed to the inboard side surface of the corresponding rear side member 91 using fasteners, welding, and/or the like.

The bent portion 12b of the second intermediate crossmember 12 may be fixed to the corresponding end portion of the first intermediate crossmember 11 and the front portion of the corresponding rear side member 91, and accordingly the second intermediate crossmember 12 may connect the end portion of the first intermediate crossmember 11 and the front portion of the rear side member 91. Thus, the second intermediate crossmember 12 may support the overall torsional stiffness of the vehicle.

A cross section of the center portion 12a of the second intermediate crossmember 12 may be uniform in a longitudinal direction thereof (in the width direction of the vehicle), and accordingly the center portion 12a of the second intermediate crossmember 12 may have the same cross-sectional area in the longitudinal direction thereof. A cross section of the bent portion 12b of the second intermediate crossmember 12 may be uniform in a longitudinal direction thereof (in the height direction of the vehicle), and accordingly the bent portion 12b of the second intermediate crossmember 12 may have the same cross-sectional area in the longitudinal direction thereof. The second intermediate crossmember 12 may have an angular cross section or a circular cross section with a cavity defined therein, and accordingly the second intermediate crossmember 12 may have a closed cross section.

According to an exemplary embodiment, the second intermediate crossmember 12 may be made of a mass-produced steel pipe having an angular cross section or a circular cross section with a cavity defined therein.

According to an exemplary embodiment, the cross section of the center portion 12a may be the same as the cross section of the bent portion 12b. In particular, the cross section of the center portion 12a and the cross section of the bent portion 12b may be the same as the cross section of the first intermediate crossmember 11.

As set forth above, according to exemplary embodiments of the present disclosure, as two intermediate crossmembers are designed to connect the pair of side sills and the pair of rear side members, the vehicle intermediate structure may provide two closed cross sections on the top and bottom sides thereof, thereby improving the stiffness of the vehicle frame itself.

According to exemplary embodiments of the present disclosure, each intermediate crossmember may improve its own stiffness and joint stiffness between the intermediate crossmember and the rear side member, thereby improving the torsional stiffness of the vehicle.

According to exemplary embodiments of the present disclosure, the manufacturing cost of the intermediate structure may be significantly reduced by applying a relatively inexpensive material such as a standardized mass-produced steel pipe to the second intermediate crossmember, compared to the use of pressed steel materials and aluminum materials.

According to exemplary embodiments of the present disclosure, the first intermediate crossmember may be made of a material having relatively high stiffness, and the first intermediate crossmember and the pair of rear side members may be connected through the mechanical joint system. Accordingly, deformation in the front portion of the rear side member may be relatively minimized, and deformation in the rear portion of the rear side member may be relatively greater than that in the front portion thereof. As the rear portion of the rear side member is significantly deformed, and the front portion of the rear side member is less deformed than the rear portion of the rear side member, the front portion of the rear side member may sufficiently support an impact load, thereby achieving the following effects: allowing the rear portion of the battery to be relatively less deformed (bent); preventing the rear subframe from directly hitting the rear portion of the battery; preventing the rear subframe from intruding into the rear of the passenger compartment; and preventing the cable of the battery from being bent to thereby reduce the risk of fire.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle intermediate structure comprising:
a first intermediate crossmember connecting a pair of side sills in a width direction of a vehicle;
wherein each end face of the first intermediate crossmember is attached to an inboard side surface of a corresponding side sill; and
wherein a cross section of the first intermediate crossmember is uniform in a longitudinal direction thereof;
wherein the first intermediate crossmember is supported with respect to the pair of side sills through a pair of support brackets, respectively; and
wherein the support bracket includes a first fixed surface that is fixed to the inboard side surface of the corresponding side sill, a second fixed surface that is fixed to a bottom surface of the first intermediate crossmember, and an inclined surface extending obliquely between a bottom end of the first fixed surface and an inboard-side end of the second fixed surface.

2. The vehicle intermediate structure according to claim 1, wherein:
the first intermediate crossmember supports a pair of rear side members through a mechanical joint system; and
each rear side member is connected to a rear portion of the corresponding side sill.

3. The vehicle intermediate structure according to claim 2, wherein a front end face of the rear side member is fixed to a rear surface of the first intermediate crossmember adjacent to each end portion of the first intermediate crossmember.

4. The vehicle intermediate structure according to claim 3, wherein:
the rear side member has an opening provided in a front portion thereof; and
the end portion of the first intermediate crossmember is fitted into the opening of the corresponding rear side member.

5. The vehicle intermediate structure according to claim 4, wherein:
the rear side member includes a top retention portion extending from a top end of the front end face to the first intermediate crossmember;
the top retention portion is fixed to a top surface of the first intermediate crossmember; and
the opening has an L-shaped cross section defined by the top retention portion and the front end face.

6. The vehicle intermediate structure according to claim 4, wherein:
the rear side member includes a top retention portion extending from a top end of the front end face to the first intermediate crossmember and a bottom retention portion extending from a bottom end of the front end face to the first intermediate crossmember;
the top retention portion is fixed to a top surface of the first intermediate crossmember;
the bottom retention portion is fixed to the bottom surface of the first intermediate crossmember; and
the opening has a U-shaped cross section defined by the top retention portion, the front end face, and the bottom retention portion.

7. The vehicle intermediate structure according to claim 6, wherein:
the top retention portion has a top recess which is recessed from a top surface of the top retention portion toward the first intermediate crossmember; and
the bottom retention portion has a bottom recess which is recessed from a bottom surface of the bottom retention portion toward the first intermediate crossmember.

8. The vehicle intermediate structure according to claim 1, wherein:
the first intermediate crossmember further includes a retention portion extending from a top end of each end face thereof to the corresponding side sill; and
the retention portion is fixed to a top surface of the corresponding side sill.

9. The vehicle intermediate structure according to claim 1, wherein:
the first intermediate crossmember has a closed cross section; and
the first intermediate crossmember comprises a high-tensile strength steel plate.

10. A vehicle intermediate structure comprising:
a first intermediate crossmember connecting a pair of side sills in a width direction of a vehicle; and
a second intermediate crossmember connected to the first intermediate crossmember, the second intermediate crossmember comprising a center portion extending in the width direction of the vehicle and a pair of bent portions provided on both ends of the center portion;
wherein each end face of the first intermediate crossmember is attached to an inboard side surface of the corresponding side sill;
wherein a cross section of the first intermediate crossmember is uniform in a longitudinal direction thereof;
wherein each bent portion of the second intermediate crossmember is fixed to each end portion of the first intermediate crossmember and a corresponding rear side member;
wherein the first intermediate crossmember is supported with respect to the pair of side sills through a pair of support brackets, respectively; and
wherein each support bracket includes a first fixed surface that is fixed to the inboard side surface of the corresponding side sill, a second fixed surface that is fixed to a bottom surface of the first intermediate crossmember, and an inclined surface extending obliquely between a bottom end of the first fixed surface and an inboard-side end of the second fixed surface.

11. The vehicle intermediate structure according to claim 10, wherein:
a front surface of each bent portion is fixed to the end portion of the corresponding first intermediate crossmember; and
an outboard side surface of the bent portion is fixed to an inboard side surface of the corresponding rear side member.

12. The vehicle intermediate structure according to claim 10, wherein:
the center portion is located higher than the first intermediate crossmember; and
the bent portion is bent from each end of the center portion toward the first intermediate crossmember.

13. The vehicle intermediate structure according to claim 10, wherein:

a longitudinal axis of the center portion is parallel to a longitudinal axis of the first intermediate crossmember; and a longitudinal axis of the bent portion is perpendicular to the longitudinal axis of the center portion.

14. The vehicle intermediate structure according to claim 10, wherein:

a cross section of the center portion of the second intermediate crossmember is uniform in a longitudinal direction thereof; and a cross section of the bent portion of the second intermediate crossmember is uniform in a longitudinal direction thereof.

15. The vehicle intermediate structure according to claim 10, wherein the cross section of the center portion is the same as the cross section of the bent portion.

16. The vehicle intermediate structure according to claim 10, wherein the second intermediate crossmember comprises a mass-produced steel pipe having a closed cross section.

17. A vehicle frame comprising:

a center frame module comprising a pair of side sills disposed on both side edges thereof;

a front structure connected to a front of the center frame module;

a rear frame module connected to a rear of the center frame module; and an intermediate structure disposed between the center frame module and the rear frame module, the intermediate structure comprising a first intermediate crossmember connecting the pair of side sills in a width direction of the vehicle frame;

wherein each end face of the first intermediate crossmember is attached to an inboard side surface of the corresponding side sill;

wherein a cross section of the first intermediate crossmember is uniform in a longitudinal direction thereof;

wherein the first intermediate crossmember is supported with respect to the pair of side sills through a pair of support brackets, respectively; and wherein the support bracket includes a first fixed surface that is fixed to the inboard side surface of the corresponding side sill, a second fixed surface that is fixed to a bottom surface of the first intermediate crossmember, and an inclined surface extending obliquely between a bottom end of the first fixed surface and an inboard-side end of the second fixed surface.

18. The vehicle frame according to claim 17, wherein:

the first intermediate crossmember supports a pair of rear side members through a mechanical joint system; and each rear side member is connected to a rear portion of the corresponding side sill.

19. The vehicle frame according to claim 18, wherein a front end face of the rear side member is fixed to a rear surface of the first intermediate crossmember adjacent to each end portion of the first intermediate crossmember.

20. The vehicle frame according to claim 19, wherein:

the rear side member has an opening provided in a front portion thereof;

the end portion of the first intermediate crossmember is fitted into the opening of the corresponding rear side member;

the rear side member includes a top retention portion extending from a top end of the front end face to the first intermediate crossmember and a bottom retention portion extending from a bottom end of the front end face to the first intermediate crossmember;

the top retention portion is fixed to a top surface of the first intermediate crossmember;

the bottom retention portion is fixed to the bottom surface of the first intermediate crossmember; and the opening has a U-shaped cross section defined by the top retention portion, the front end face, and the bottom retention portion.

\* \* \* \* \*